April 26, 1960 H. KERSHAW ET AL 2,933,829

SCALE MODEL ASSEMBLY JIG

Filed Feb. 25, 1958

INVENTORS
Harold Kershaw
Edward D. Dowling
BY Walter S. Miller
G. H. Palmer
V. F. Davies
ATTORNEYS United States Patent Office
2,933,829
Patented Apr. 26, 1960

2,933,829

SCALE MODEL ASSEMBLY JIG

Harold Kershaw, River Edge, N.J., Edward D. Dowling, Queens Village, N.Y., and Walter S. Miller, Hillsdale, N.J., assignors to The M. W. Kellogg Company, Jersey City, N.J., a corporation of Delaware Application February 25, 1958, Serial No. 717,421

13 Claims. (Cl. 35—16)

Figures 1, 2, 3, 4:
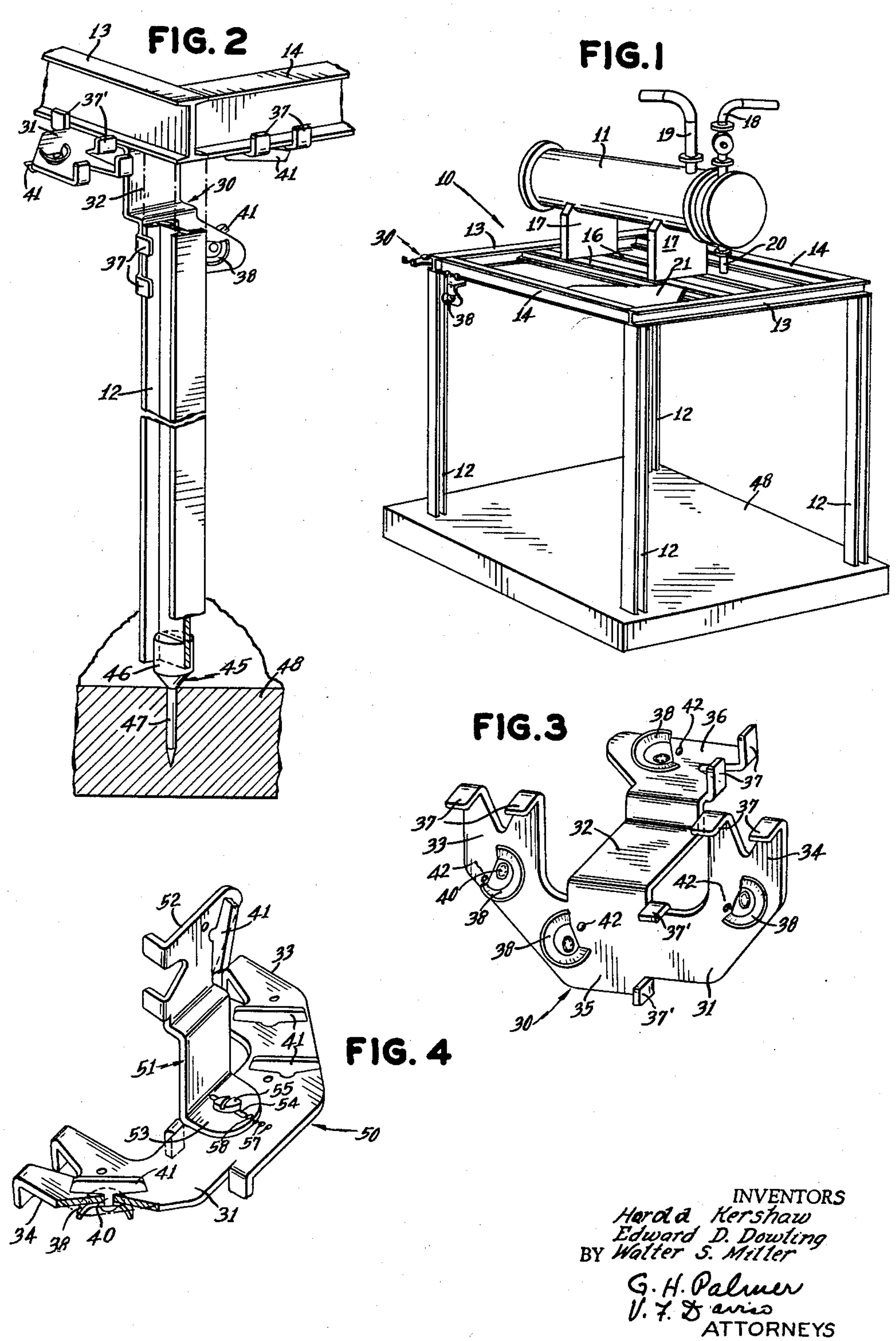

The present invention relates to three-dimensional scale models and the making thereof, useful in connection with the planning, the design and the erection of large complicated plants and particularly to arrangements for rapidly and accurately assembling structural components of such models.

Modern manufacturing and processing plants are often so large and so complicated that it is difficult to envision the total plant from the customary two-dimensional drawings, since these present the concepts involved as bits and pieces of many drawings and are insufficient in giving a complete representation of such concepts and in showing the spatial relationships, clearances, interferences, etc. Because of the great number, two-dimensional drawings ofttimes complicate matters particularly when changes and modifications in plan and design are made. As an aid to visualization, perspective and isometric drawings have come into use. Such drawings are time consuming to make and thus are expensive and while they are of value to illustrate details and simple setups their value diminishes rapidly as plant complexity rises. Such drawings are not practical as planning and design aids since they can be made reasonably complete only when the plant design is well established. In other words they tend to follow rather than lead planning and design. They are of value as erection and maintenance aids, but again their value diminishes rapidly as the plant becomes complex.

In recognition of these factors there is an increasing tendency on the part of industrial designers to employ three-dimensional scale models as aids in planning, design and erection of large and complicated plants. The worth of suitable scale models as an effective medium for expressing engineering ideas is generally appreciated. Components can be presented in their entirety rather than in bits and pieces of many drawings and may be shown in their true proportions and spatial relationships. Equipment locations, piping, constructural arrangements and placement of control or maintenance equipment can be easily appraised and evaluated. Scaled models for engineering and construction purposes should not be an end in themselves but should merely serve as the design medium similar to the two-dimensional drawings they are intended to replace. The objective is more efficient design of better plants. Scaled models as conventionally made are largely tailored-to-measure affairs and built by professional model makers piece by piece from appropriate drawings and are usually considered as an end in themselves. Thus, these tailored-to-measure models are not well adapted to serve the purposes of original design.

We have heretofore proposed to provide for the making of scaled, three-dimensional models largely by the use of preformed, standardized, scaled components that may be quickly and cheaply assembled to embody design concepts so that conventional design drawings may be eliminated and the design carried out directly on the model. The preformed components and their manner of assembly and attachment are such that the model may be easily changed and revised as the design progresses and when the design is satisfactorily completed the model components may be permanently joined by simple expedients into a unified structure that completely represents the designed plant and is a master plant thereof from which erection, detailing and planning and material delivery scheduling may be carried out. The master plan model furthermore, is such that it becomes an important aid in the erection operation and maintenance of the plant. This proposal is disclosed at length in our prior application Serial No. 711,065, filed January 24, 1958.

In accordance with our prior proposal, conventional structural members such as I-beams are formed of a suitable extruded plastic material and are provided in several scaled section sizes in convenient lengths. These lengths are cut by means of simple expedients to provide the structural components of the model. The assembling of the components so as to accurately relatively position them and to unite them into a unitary structure presents a considerable problem.

It is the principal object of this invention to provide a jig for assembling the structural members of a scaled model which is of simple, rugged construction and makes possible rapid and accurate relative positioning of said members and holding of said members in said position for uniting as by application of a suitable adhesive or otherwise, or prior to said uniting, permits ready release of said members for change and/or adjustment.

It is also a principal object of this invention to provide a jig for assembling the structural members of a scaled model which includes structural members aligning means disposed to align a structural member, or structural members, along a line or lines disposed in a single plane or in intersecting planes and readily operable releasable means for releasably retaining the structural members in position relative to their respective aligning means.

The further objects, features and advantages of the invention will become apparent through a consideration of the following description of a present preferred embodiment of the invention taken with the accompanying drawings in which Fig. 1 is a perspective view of a portion of a model structure formed of structural members which prior to the application of an adhesive are held in position by the novel jig of the invention, Fig. 2 is a perspective fragmentary view on an enlarged scale, illustrating the use of the present preferred form of the jig of the invention, Fig. 3 is a perspective view of the jig of the invention showing the details of the construction thereof, and Fig. 4 is a perspective view of a modified form of the jig of the invention.

The novel jig of the invention is of general application but for the purposes of this disclosure it will be described in connection with three-dimensional scale models and the assembly and erection of the structural member components thereof. While structural members may be of various cross-sections, and jigs embodying the invention may be formed and arranged to successfully handle practically all of them, the jig disclosed is particularly adapted to handle model structural members such as I-beams, channels, angles, etc., which include at least one substantially flat element, or flange, which runs along the full length thereof. Also, the jig of the invention is not limited to the use of model structural members formed of any particular material. It will be described, however, in connection with model structural members formed of extruded plastic material since this material and mode of formation provide model structural components that are accurately scaled, are uniform in character and are comparatively cheap. While a large number of plastic materials is available, experience has shown that polystyrene is to be preferred. This plastic in the dense form produces strong, light-weight, accurately dimensioned extrusions and is easily colored by a wide range of colors for color coding. Polystyrene has to the distinct advantage that it may be easily and securely attached to itself by a large number of adhesives and/or solvents.

A scale model arrangement is shown in Fig. 1 which includes a structure 10 for supporting a heat exchanger 11. The arrangement shown is a common one in a petroleum refinery. It is not the intent, however, to disclose any particular plant operation but rather it is intended to illustrate a typical model involving model structural components and the manner in which said components may be assembled and arranged by employing the novel jig of the invention. The model structure 10 is made up of a plurality of vertical columns 12 in the form of I-beams disposed at the four corners of the structure which are connected by the horizontal members 13 and 14 also in the form of I-beams. The horizontal members 13 have in turn connected thereto the horizontal I-beams 16 upon which the pedestals 17 of the heat exchanger 11 are supported. As shown, heat exchanger 11 has a plurality of pipe lines 18, 19 and 20 connected thereto for conducting the heat exchange media thereto and therefrom. A flat platform member 21 formed, for instance, of solid polystyrene in the sheet form is attached to the horizontal I-beams 16, 13 and 14, and is provided to simulate the platforms usual on these structures for access to the supported heat exchangers, or other supported component, for inspection and maintenance. A jig 30 embodying the features of the invention is shown holding in assembled relation the I-beams 12, 13 and 14 which form the back lefthand corner of the structure 10. While the model structural members may be made to any convenient scale, at present a ⅜"=12" scale is preferred.

As best shown in Fig. 3 the jig 30 comprises a main plate section 31 which is flat and is disposed in a single plane and a stepped secondary section 32 which includes a plane normal to the plane of the main section 31. As indicated sections 31 and 32 are conveniently formed out of a single flat metal sheet with portions thereof cut away to permit the secondary section 32 to be bent through a right angle. The main section 31 includes three aligning and clamping arrangements 33, 34 and 35, while section 32 includes a single aligning and clamping arrangement 36. The aligning and clamping arrangements are substantially alike and each includes a pair of alignment prongs and a clamping cam member. The alignment prongs 37 of the arrangements 33, 34 and 36 are provided by cutting out portions of the sections 31 and 32 to provide fork-like structures and the extremities of the tine-like members thus produced are bent through an angle of approximately 90° to provide the prongs 37. The aligning prongs 37' of the arrangement 35 are provided by separating portions of the plate section 31 and bending these portions through an angle of approximately 90°. The angle through which the prongs 37 and 37' are bent is somewhat more than 90° so as to prevent the flanges that they engage in use from slipping up and out of said prongs. It is noted that the prong 37' farthest removed from the section 32 is rotated through an angle of 90° relative to the other prong 37'. Each pair of prongs 37 and 37' has spaced therefrom a cam-shaped clamping member 38. The cam member 38 is mounted on the end of the pin 40 that extends through the respective plate section 31 or 32 and has a wing piece 41 at its other end for rotating the pin 40 and the cam member 38. The cam member 38 is eccentrically mounted on the pin 40 and is cup or saucer shaped so as to engage the upper surface of the flange of the construction member and cause it to bear firmly on the face of the respective plate section 31 or 32 and against its respective pair of prongs 37 or 37'. Adjacent each cam member 38 is a punched up protuberance 42 which serves to limit the rotation of the cam member 38 to an "open" position so that the flange of the model structural member may quickly and properly be inserted in position.

In assembling a structure formed of model structural elements, a centering pin 45 which as shown in Fig. 2, includes a slotted head 46 adapted to receive the web of an I-beam is positioned so that its pin member 47 enters a mounting board 48 on the center line of a vertical column. The I-beam 12 which is to form the vertical column has one end of its web inserted into the slot of the slotted head 46 centering pin 45 to retain the I-beam column 12 firmly in place vertically on said center line. The jig 30 is then positioned at the upper end of the I-beam forming the column 12 so that the clamp arrangement of the secondary section 32 extends downwardly and engages the vertical column 12. The wing member 41 is then rotated to carry the cam 38 into contact with the protuberance 42 and the flange of the I-beam 12 firmly positioned against the surface of the section 31. The wing member 41 is then rotated to carry the cam 38 and the prongs 37 in tight engagement with the flange of the I-beam column 12. The top end of the I-beam is so positioned relative to the jig 30 that this end about reaches the plane of the main section 31. The horizontal I-beams 13 may then be positioned relative to the clamp arrangement 35 of the main section 31 and securely fastened in position by the rotation of the respective cam 38. After this is done the horizontal piece 14 is positioned on the main section 31 and secured in position relative to the column 12 and the horizontal I-beams 13 by manipulation of the clamp arrangement 33 carried by the main portion 31. The various model structural members may be relatively moved by manipulation of the respective clamp arrangements to assure accurate location thereof in the required positions. The jig 30 may be allowed to remain in position until the model making, or the design thereof, has progressed to the point where finalization is achieved at which time the various structural model members may be integrated into a unitary structure by having a suitable adhesive or solvent applied thereto. At the end of this operation the jig 30 may be removed and passed to use in the assembly of other portions of the model structure.

It is often necessary to accommodate columns of different sizes while maintaining the size of the horizontal members such as I-beams 13 and 14 fixed. This may be accomplished by providing a series of suitably proportioned jigs or a single jig with one or more adjustable members which provide the necessary versatility. A jig which includes an adjustable member is shown in Fig. 4. This jig 50 includes main section and clamp arrangements carried thereby that are the same as those disclosed in connection with the jig 30 of Fig. 3. For this reason the numerical reference to mentioned elements is the same as in Fig. 3. The integral secondary section 32 of Fig. 3 is eliminated and in lieu thereof a separate bracket member 51 is provided which includes a clamping arrangement 52 similar to the arrangement 32 of Fig. 2, and is adjustably positionable relative to the main section 31 and the clamping arrangements 33, 34 and 35 carried thereby. The bracket member 51 includes a flat element 53 integral therewith but offset therefrom through an angle of 90°, which is adapted to bear against the surface of the main section 31. The element 53 is adapted to be releasably positioned in several positions of adjustment relative to the section 31. For this purpose an elongated slot 54 is cut in the element 53 to receive the shank of the screw 55 which screws into a tapped hole in the main section 31 and whose head bears on the surface of the element 53 to hold it firmly on the section 31. By moving the bracket 51 to move the screw 55 relative to the slot 54, the bracket 51 may be adjusted in position to bring the clamping arrangement 52 to the location required to accommodate the model structural member of the chosen size. The slot 54 is made of a length sufficient for the size range of model structural members contemplated. In order to facilitate the accurate positioning of the bracket 51 relative to the main portion 31 to accommodate a model structural element a size within the design size range, the main section 31 is provided with a plurality of spaced indentations 57 which are adapted to receive a protuberance 58 punched in the flat element 53. The indentations 57 are accurately located and each corresponds to a model structural element size within said design range. This arrangement provides a means for accommodating several sizes of vertical columns and increases the versatility of the assembly jig.

Having thus described our invention by reference to a specific application, it should be understood that no undue limitations or restrictions are to be imposed by reason thereof, but that the scope of the invention is defined by the appended claims.

We claim:

1. A jig for assembling elongated model structural members which comprises a reference plane defining means, means defining a reference line in said plane, means defining a second reference line in said plane intersecting said first reference line, a second reference plane defining means angularly disposed relative to said first plane defining means, means defining a reference line in said second plane angularly disposed relative to the reference lines of said first plane and positioned to locate a model structural member disposed thereon with its center line intersecting the center lines of structural members positioned on said reference lines of said first reference plane, and releasable clamping means carried by each of said plane defining means adjacent each of said line defining means for releasably clamping an elongated structural member relative to its respective plane and against its respective reference line defining means and along the respective reference line.

2. A jig for assembling elongated model structural members which comprises a flat member defining a reference plane, means defining a plurality of angularly disposed reference lines in said plane, and means for releasably clamping elongated structural members to said flat member along said angularly disposed lines, each of said line defining means including a pair of spaced elements extending from said member and each of said clamping means spaced from its respective pair of said elements and positioned therebetween along its respective reference line.

3. A jig for assembling elongated model structural members which comprises a flat member defining a reference plane, a pair of spaced protuberances extending from said member and away from said plane to define a reference line on said plane, and clamping means spaced from said protuberances and positioned between said protuberances relative to said line for releasably clamping a flat elongated component of a model structural member to said flat member and against said protuberances along said reference line.

4. A jig for assembling elongated model structural members as defined in claim 3, in which said clamping means includes a rotatably mounted cam member having an outwardly sloped periphery adapted to engage said component.

5. A jig for assembling elongated structural members as defined in claim 3, in which said clamping means includes a frusto-conical member mounted for eccentric rotation and with its minimum diameter adjacent said flat member.

6. A jig for assembling elongated structural members as defined in claim 3, in which said clamping means includes a frusto-conical member positioned with its minimum diameter proximate said flat member, a rotatable member extending through said flat member for rotation therein, said frusto-conical member eccentrically mounted on one end of said rotatable member for rotation therewith, the other end of said rotatable member terminating in an enlarged head for manipulation thereof and rotation of said frusto-conical member.

7. A jig for assembling elongated structural members as defined in claim 3, in which said clamping means includes a frusto-conical cam member having a peripheral section thereof cut away to provide a straight edge, said cam member positioned on said flat member with its minimum diameter proximate said flat member, a rotatable member extending through said flat member for rotation therein, said cam member eccentrically mounted on an end of said rotatable member and adjacent said straight edge, the other end of said rotatable member terminating in an enlarged head for manipulation thereof.

8. A jig for assembling elongated structural members as defined in claim 7, in which a stop element extends from the surface of said flat member and is located to engage said straight edge of said cam adjacent the end thereof furthest removed from said rotatable member when said straight edge is approximately parallel to said reference line, said stop of a height to permit rotation of said cam in a direction to engage the structural member to be clamped in position in said jig.

9. A jig for assembling elongated model structural members which comprises a reference plane defining means, means carried by said plane defining means defining a reference line in said plane, a second reference plane defining means, means defining a reference line in said second plane, releasable clamping means carried by each of said plane defining means for releasably clamping an elongated structural member relative to its respective plane and the respective reference line defining means thereof, bracket means carrying said second reference plane defining means adapted to be positioned on said first plane defining means with said second plane and second reference line disposed normal to said first plane, and means for adjustably retaining said bracket means on said first plane defining means.

10. A jig for assembling elongated model structural members as defined in claim 9, in which means are provided for accurately positioning said bracket means relative to said first plane defining means in a plurality of positions of adjustment each of which provides a predetermined spacing between said reference lines.

11. A jig for assembling elongated model structural members as defined in claim 9, in which a screw and slot connection is provided for adjustably retaining said bracket means relative to said first plane defining means, and accurate relative positioning of said bracket means and said first plane defining means is obtained by providing a protuberance on said bracket and a plurality of spaced depressions in said first plane defining means which are adapted to receive said protuberance.

12. In a model structure including a vertical column, a model mounting board, means insertable in said board at the required location of the center line of the vertical column, a vertical column formed of a length of a model structural member having an elongated flat section which includes the center line of said structural member, said insertable means having a head receiving one end of the flat section of said structural member and positioning the center line of said structural member at said location, a jig member releasably clamped to the upper end of said model structural member, said jig member including an element defining a plane parallel to said center line and a second element defining a plane normal to said center line, and a length of a model structural member releasably clamped to said second plane defining element and abutting the other end of the vertical column forming member.

13. The model structure defined in claim 12, in which said insertable means includes an elongated pointed member terminating in an enlarged head having a diametrical slot cut therein to receive said one end of said flat section.

References Cited in the file of this patent

UNITED STATES PATENTS

| | | |
|---|---|---|
| 799,980 | Ferris | Sept. 19, 1905 |
| 2,607,972 | Rust | Aug. 26, 1952 |
| 2,738,584 | Parker | Mar. 20, 1956 |

FOREIGN PATENTS

| | | |
|---|---|---|
| 517,107 | Great Britain | Sept. 3, 1938 |
| 451,299 | Italy | Apr. 6, 1949 |